(12) United States Patent
Bar-Or Tillinger et al.

(10) Patent No.: US 11,778,561 B2
(45) Date of Patent: Oct. 3, 2023

(54) DOWNLINK CONTROL INFORMATION (DCI) FORMAT FOR SLEEP CONFIGURATION

(71) Applicant: QUALCOMM Incorporated, San Diego, CA (US)

(72) Inventors: Amit Bar-Or Tillinger, Tel-Aviv (IL); Gideon Shlomo Kutz, Ramat Hasharon (IL); Idan Michael Horn, Hod Hasharon (IL); Shay Landis, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 204 days.

(21) Appl. No.: 17/344,861

(22) Filed: Jun. 10, 2021

(65) Prior Publication Data

US 2022/0400443 A1 Dec. 15, 2022

(51) Int. Cl.
*H04W 52/02* (2009.01)
*H04L 5/00* (2006.01)

(52) U.S. Cl.
CPC ....... *H04W 52/0241* (2013.01); *H04L 5/0053* (2013.01)

(58) Field of Classification Search
CPC ............. H04W 52/0241; H04L 5/0053; H04L 5/0007; H04L 5/0094; Y02D 30/70

USPC ......................................................... 455/574
See application file for complete search history.

(56) References Cited

U.S. PATENT DOCUMENTS

| 2018/0279274 | A1* | 9/2018 | Sun ........................ H04L 5/0046 |
| 2021/0329674 | A1* | 10/2021 | Matsumura ........... H04L 5/0048 |
| 2021/0392625 | A1* | 12/2021 | Lin ........................ H04L 5/0094 |
| 2023/0043139 | A1* | 2/2023 | Hwang ................. H04W 68/00 |

* cited by examiner

*Primary Examiner* — Hirdepal Singh
(74) *Attorney, Agent, or Firm* — Patterson & Sheridan, L.L.P./Qualcomm Incorporated

(57) ABSTRACT

Certain aspects of the present disclosure provide techniques for downlink control information (DCI) format for power efficiency. A method that may be performed by a user equipment (UE) includes receiving, from a base station (BS), a first DCI message in a first symbol of a downlink control channel, the first DCI message comprising a portion of an identifier that consists of less than all parts of the identifier, the first symbol being one of a plurality of symbols in a time period. The method may also include, when the portion of the identifier corresponds to the UE, receiving downlink data via resources indicated by a second DCI message, the second DCI message received in a second symbol of the downlink control channel, the second DCI message indicating the resources for receiving downlink data, the second symbol being another one of the plurality of symbols in the time period.

28 Claims, 10 Drawing Sheets

DOWNLINK CONTROL INFORMATION (DCI) FORMAT FOR SLEEP CONFIGURATION

BACKGROUND

Field of the Disclosure

Aspects of the present disclosure relate to wireless communications, and more particularly, to techniques for sleep configuration in wireless devices.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. These improvements should be applicable to other multi-access technologies and the telecommunication standards that employ these technologies.

SUMMARY

The systems, methods, and devices of the disclosure each have several aspects, no single one of which is solely responsible for its desirable attributes. After considering this discussion, and particularly after reading the section entitled "Detailed Description" one will understand how the features of this disclosure provide advantages that include improved power efficiency in wireless communication devices.

Certain aspects relate to a method for wireless communication by a user equipment (UE). The method includes receiving, from a base station (BS), a first downlink control information (DCI) message in a first symbol of a downlink control channel, the first DCI message comprising a portion of an identifier that consists of less than all parts of the identifier, the first symbol being one of a plurality of symbols in a time period. The method also includes, when the portion of the identifier corresponds to the UE, receiving downlink data via resources indicated by a second DCI message, the second DCI message received in a second symbol of the downlink control channel, the second DCI message indicating the resources for receiving downlink data, the second symbol being another one of the plurality of symbols in the time period. The method also includes, when the portion of the identifier does not correspond to the UE, entering into a sleep mode until a subsequent time period.

Certain aspects relate to a method for wireless communication by a base station (BS). The method includes transmitting, to a user equipment (UE), a first downlink control information (DCI) message in a first symbol of a downlink control channel, the first DCI message comprising a portion of an identifier of the UE that consists of less than all parts of the identifier, the portion of the identifier for notifying the UE of a future downlink data transmission to the UE, the first symbol being one of a plurality of symbols in a time period. The method also includes transmitting, to the UE, a second DCI message in a second symbol of the downlink control channel, the second DCI message indicating resources for receiving the future downlink data transmission, the second symbol being another one of the plurality of symbols in the time period.

Certain aspects relate to a user equipment (UE) configured for wireless communication. The UE includes a memory and a processor coupled to the memory. In some examples, the processor and the memory configured to receive, from a base station (BS), a first downlink control information (DCI) message in a first symbol of a downlink control channel, the first DCI message comprising a portion of an identifier that consists of less than all parts of the identifier, the first symbol being one of a plurality of symbols in a time period. In some examples, the processor and the memory configured to, when the portion of the identifier corresponds to the UE, receive downlink data via resources indicated by a second DCI message, the second DCI message received in a second symbol of the downlink control channel, the second DCI message indicating the resources for receiving downlink data, the second symbol being another one of the plurality of symbols in the time period. In some examples, the processor and the memory configured to, when the portion of the identifier does not correspond to the UE, enter into a sleep mode until a subsequent time period.

Certain aspects relate to a base station (BS) configured for wireless communication. The BS includes a memory and a processor coupled to the memory. In some examples, the memory and the processor are configured to transmit, to a user equipment (UE), a first downlink control information (DCI) message in a first symbol of a downlink control channel, the first DCI message comprising a portion of an identifier of the UE that consists of less than all parts of the identifier, the portion of the identifier for notifying the UE of a future downlink data transmission to the UE, the first symbol being one of a plurality of symbols in a time period. In some examples, the memory and the processor are configured to transmit, to the UE, a second DCI message in a second symbol of the downlink control channel, the second DCI message indicating resources for receiving the future downlink data transmission, the second symbol being another one of the plurality of symbols in the time period.

Certain aspects relate to a user equipment (UE). The UE includes means for receiving, from a base station (BS), a first downlink control information (DCI) message in a first symbol of a downlink control channel, the first DCI message comprising a portion of an identifier that consists of less than all parts of the identifier, the first symbol being one of a plurality of symbols in a time period. The UE also includes, when the portion of the identifier corresponds to the UE, means for receiving downlink data via resources indicated by a second DCI message, the second DCI message received in a second symbol of the downlink control channel, the second DCI message indicating the resources for receiving downlink data, the second symbol being another one of the plurality of symbols in the time period. The UE also includes, when the portion of the identifier does not correspond to the UE, means for entering into a sleep mode until a subsequent time period.

Certain aspects relate to a base station (BS). The BS includes means for transmitting, to a user equipment (UE), a first downlink control information (DCI) message in a first symbol of a downlink control channel, the first DCI message comprising a portion of an identifier of the UE that consists of less than all parts of the identifier, the portion of the identifier for notifying the UE of a future downlink data transmission to the UE, the first symbol being one of a plurality of symbols in a time period. The BS also includes means for transmitting, to the UE, a second DCI message in a second symbol of the downlink control channel, the second DCI message indicating resources for receiving the future downlink data transmission, the second symbol being another one of the plurality of symbols in the time period.

Certain aspects relate to a non-transitory computer-readable medium having instructions stored thereon that, when executed by a user equipment (UE), cause the UE to perform operations. The operations include receiving, from a base station (BS), a first downlink control information (DCI) message in a first symbol of a downlink control channel, the first DCI message comprising a portion of an identifier that consists of less than all parts of the identifier, the first symbol being one of a plurality of symbols in a time period. The operations also include, when the portion of the identifier corresponds to the UE, receiving downlink data via resources indicated by a second DCI message, the second DCI message received in a second symbol of the downlink control channel, the second DCI message indicating the resources for receiving downlink data, the second symbol being another one of the plurality of symbols in the time period. The operations also include, when the portion of the identifier does not correspond to the UE, entering into a sleep mode until a subsequent time period.

Certain aspects relate to a non-transitory computer-readable medium having instructions stored thereon that, when executed by a base station (BS), cause the BS to perform operations. The operations include transmitting, to a user equipment (UE), a first downlink control information (DCI) message in a first symbol of a downlink control channel, the first DCI message comprising a portion of an identifier of the UE that consists of less than all parts of the identifier, the portion of the identifier for notifying the UE of a future downlink data transmission to the UE, the first symbol being one of a plurality of symbols in a time period. The operations also include transmitting, to the UE, a second DCI message in a second symbol of the downlink control channel, the second DCI message indicating resources for receiving the future downlink data transmission, the second symbol being another one of the plurality of symbols in the time period.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain aspects of this disclosure and the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
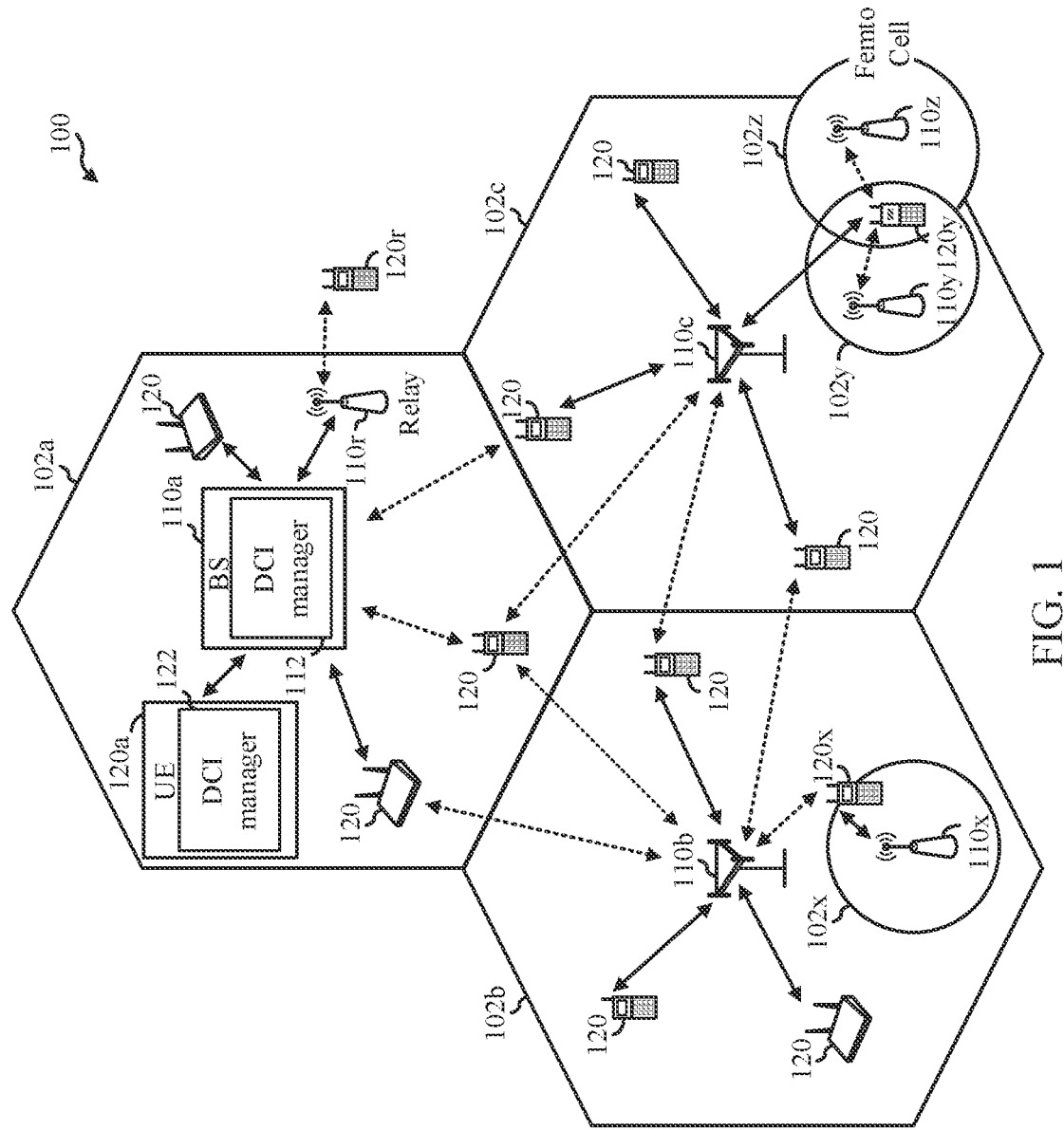
FIG. 1 is a block diagram conceptually illustrating an example wireless communication network, in accordance with certain aspects of the present disclosure.
Figure 1:
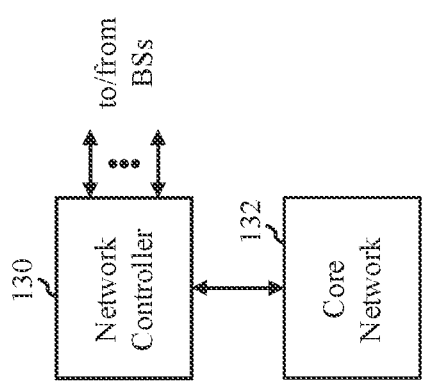

Aspects of the present disclosure provide apparatus, methods, processing systems, and computer readable mediums for DCI format for sleep configuration in wireless devices.

Packet-data traffic in a cellular network can be bursty. That is, wireless communication traffic can often be characterized by periods of transmission and reception activity followed by longer periods with no communication. It may be beneficial for a user equipment (UE) to monitor downlink control signaling in each slot (or even more frequently) to receive uplink grants or downlink data transmissions and instantaneously react to changes in the traffic behavior. However, such monitoring of one or more frequency bands comes at a cost in terms of power consumption at the UE; the receiver circuitry (e.g., antennas, and processing of analog-to-digital converters (ADCs), digital-front-end (DFE) circuitry, baseband processing, etc.) in a typical UE represents a non-negligible amount of power consumption. This can especially be problematic for battery operated UEs, because such monitoring can cause a significant reduction in the life of the battery.

One technique for reducing UE power consumption includes a discontinuous reception (DRX) mode of operation. The basic mechanism for DRX is a configurable DRX cycle in the UE. For example, the DRX cycle defines UE sleep periods where UE can go to sleep, and UE active periods where the UE monitors one or more control channels for possible allocations. In other words, with a DRX cycle configured, the UE can monitor the downlink control signaling when active, then sleep with the receiver circuitry switched off the remaining time. This allows for a significant reduction in UE power consumption.

Complementary to DRX mode, and as described in more detail below, UE power consumption can be further reduced by "fast signaling" communications, which provide the UE with an indication of resource allocation, and an expected communication parameter (e.g., signal-to-noise ratio (SNR)) and/or modulation coding scheme (MCS) associated with an indicated resource allocation. Here, the fast signaling communications reduce power consumption by reducing the amount of time required to decode resource allocation indications, and thereby providing the UE with a longer sleep cycle during which receiver circuitry can be switched off when there is no resource allocation for the UE.

As discussed below, the fast signaling communications may include a downlink control information (DCI) format configured to carry an indication of resource allocation per UE by way of a reduced-resolution UE identifier and/or a reduced-resolution MCS indication. Accordingly, by reducing the resolution of certain aspects of the DCI, the amount of time required by the UE to decode and process the DCI is reduced. Thus, if no resource allocation is provided to the UE, the UE can switch off its receiver circuitry for longer periods of time.

The following description provides examples of improving power efficiency in wireless devices in communication systems. Changes may be made in the function and arrangement of elements discussed without departing from the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth, millimeter wave mmW, massive machine type communications (mMTC) targeting non-backward compatible machine type communications (MTC) techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

The electromagnetic spectrum is often subdivided, based on frequency/wavelength, into various classes, bands, channels, etc. In 5G NR two initial operating bands have been identified as frequency range designations FR1 (410 megahertz (MHz)-7.125 gigahertz (GHz)) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the international telecommunications union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may in communication with one or more base station (BSs) 110a-z (each also individually referred to herein as BS 110 or collectively as BSs 110) and/or user equipment (UE) 120a-y (each also individually referred to herein as UE 120 or collectively as UEs 120) in the wireless communication network 100 via one or more interfaces.

According to certain aspects, the BSs 110 and UEs 120 may be configured for transmitting and receiving two separate downlink control information (DCI) messages for improving power efficiency of the UE 120. As shown in FIG. 1, the BS 110a includes a DCI manager 112 configured to transmit, to the UE 120, a first DCI message in a first symbol of a downlink control channel, the first DCI message comprising a portion of an identifier of the UE that consists of less than all parts of the identifier, the portion of the identifier for notifying the UE of a future downlink data transmission to the UE, the first symbol being one of a plurality of symbols in a time period. The DCI manager 112 may also be configured to transmit, to the UE, a second DCI message in a second symbol of the downlink control channel, the second DCI message indicating resources for receiving the future downlink data transmission, the second symbol being another one of the plurality of symbols in the time period.

The UE 120a includes a DCI manager 122 configured to receive, from the BS 110a, a first DCI message in a first symbol of a downlink control channel, the first DCI message comprising a portion of an identifier that consists of less than all parts of the identifier, the first symbol being one of a plurality of symbols in a time period. The DCI manager 122 may also be configured to, when the portion of the identifier corresponds to the UE, receive downlink data via resources indicated by a second DCI message, the second DCI message received in a second symbol of the downlink control channel, the second DCI message indicating the resources for receiving downlink data, the second symbol being another one of the plurality of symbols in the time period. The DCI manager 122 may also, in certain aspects, be configured to, when the portion of the identifier does not correspond to the UE, enter into the sleep mode until a subsequent time period.

A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells.

The BSs 110 communicate with UEs 120 in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
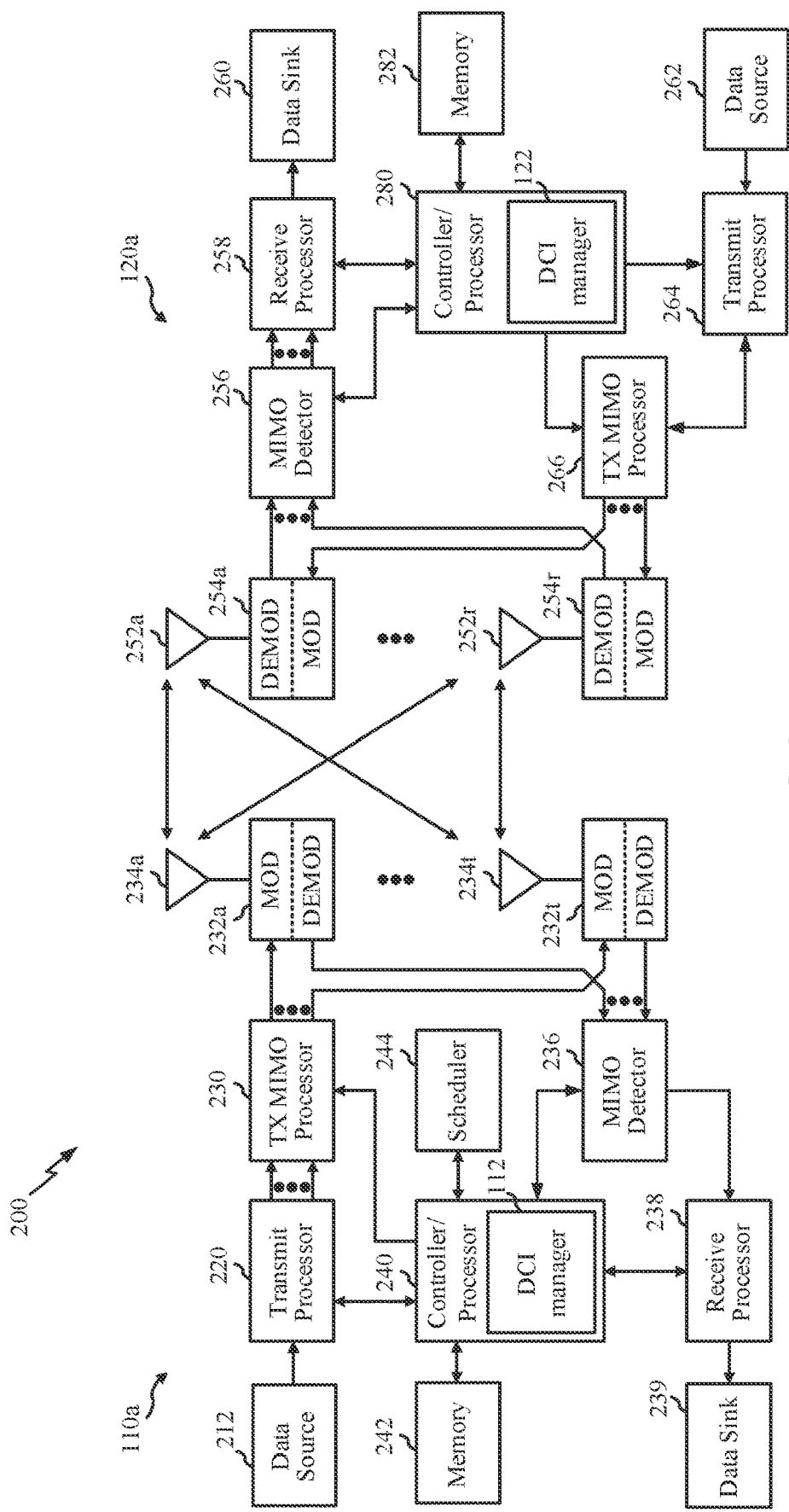
FIG. 2 is a block diagram conceptually illustrating a design of an example base station (BS) and user equipment (UE), in accordance with certain aspects of the present disclosure.

FIG. 2 illustrates example components of BS 110a and UE 120a (e.g., the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators in transceivers 232a-232t may be transmitted via the antennas 234a-234t, respectively.

The UE 120a includes receiver circuitry for receiving downlink signaling from the BS 110a. For example, UE 120a includes antennas 252a-252r configured to receive downlink signals from the BS 110a and provide received signals to demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators (MODs) in transceivers 254a-254r (e.g., for SC-FDM, etc.), and transmitted to the BS 110a. At the BS 110a, the uplink signals from the UE 120a may be received by the antennas 234, processed by the modulators in transceivers 232a-232t, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 240 of the BS 110a has a DCI manager 112 configured to transmit, to the UE 120, a first DCI message in a first symbol of a downlink control channel, the first DCI message comprising a portion of an identifier of the UE that consists of less than all parts of the identifier, the portion of the identifier for notifying the UE of a future downlink data transmission to the UE, the first symbol being one of a plurality of symbols in a time period. The DCI manager 112 may also be configured to transmit, to the UE, a second DCI message in a second symbol of the downlink control channel, the second DCI message indicating resources for receiving the future downlink data transmission, the second symbol being another one of the plurality of symbols in the time period.

As shown in FIG. 2, the controller/processor 280 of the UE 120a has a DCI manager 122 configured to receive, from the BS 110a, a first DCI message in a first symbol of a downlink control channel, the first DCI message comprising a portion of an identifier that consists of less than all parts of the identifier, the first symbol being one of a plurality of symbols in a time period. The DCI manager 122 may also be configured to, when the portion of the identifier corresponds to the UE, receive downlink data via resources indicated by a second DCI message, the second DCI message received in a second symbol of the downlink control channel, the second DCI message indicating the resources for receiving downlink data, the second symbol being another one of the plurality of symbols in the time period. The DCI manager 122 may also, in certain aspects, be configured to, when the portion of the identifier does not correspond to the UE, enter into the sleep mode until a subsequent time period.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
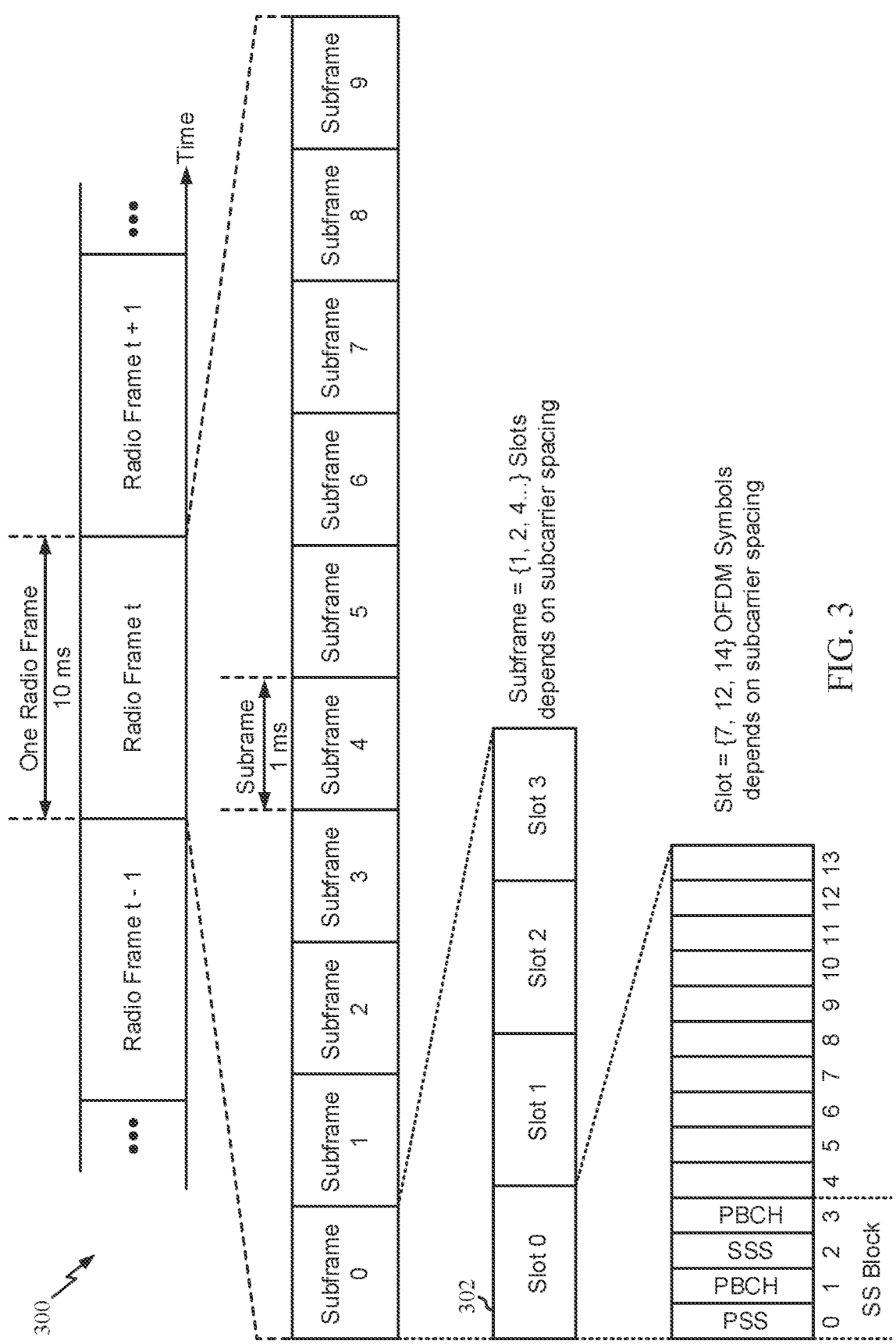
FIG. 3 is an example frame format for certain wireless communication systems (e.g., new radio (NR)), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot (e.g., a first slot 302, labeled "Slot 0") may include a variable number of symbol periods (e.g., 7, 12, or 14 symbols) depending on the SCS. The symbol periods in each slot may be assigned indices. A sub-slot structure may refer to a transmit time interval having a duration less than a slot (e.g., 2, 3, or 4 symbols). Each symbol in a slot may be configured for a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets can be transmitted at different frequency regions.

Figure 4:
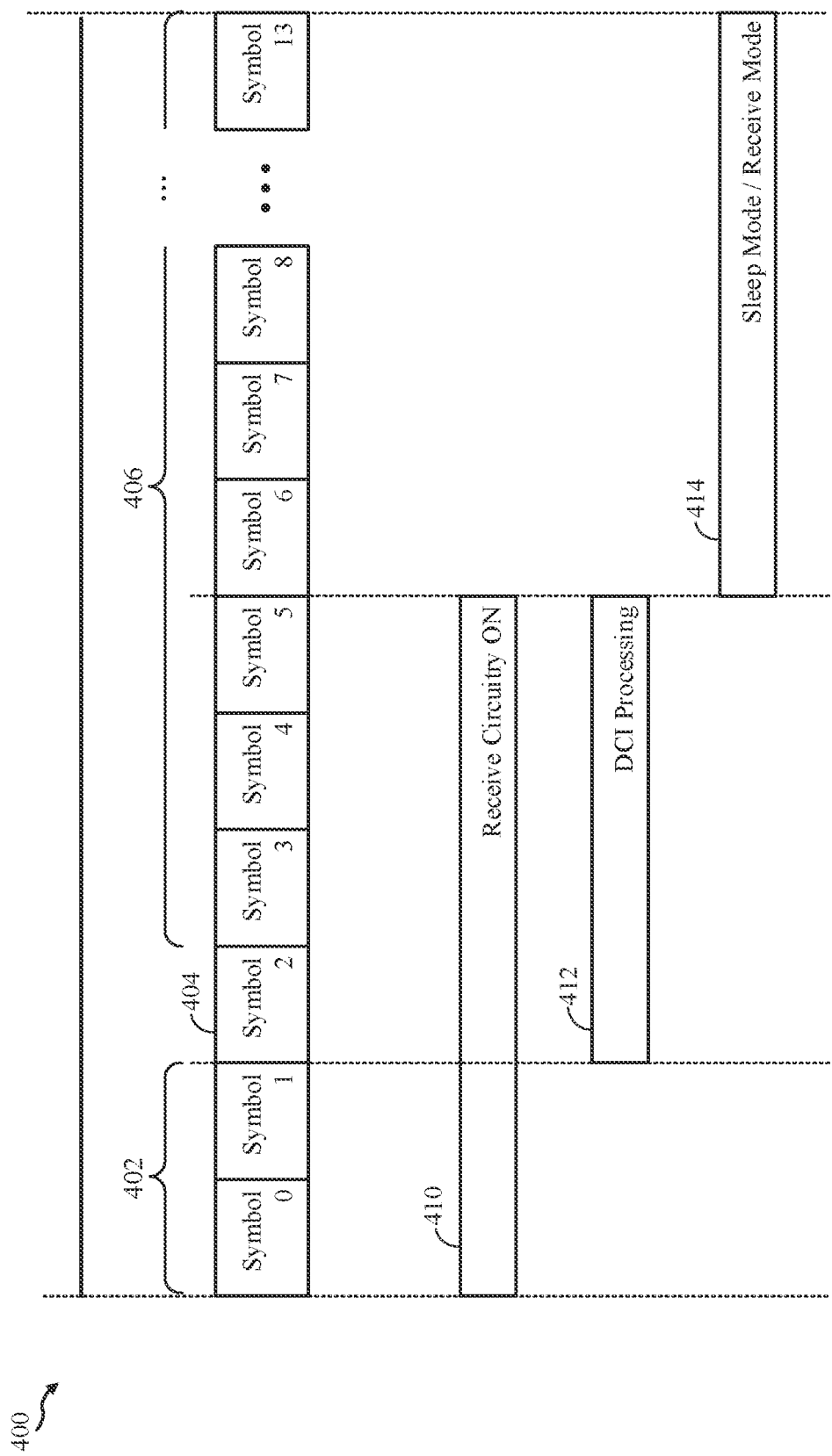
FIG. 4 is a block diagram illustrating example UE processing steps for processing a physical downlink control channel (PDCCH) carrying a conventional downlink control information (DCI) format, in accordance with certain aspects of the present disclosure.

FIG. 4 is a block diagram illustrating example UE 120 processing steps for processing a physical downlink control channel (PDCCH) carrying a conventional DCI format, using a slot 400 having 14 OFDM symbols. In this example, the slot includes a PDCCH 402 transmitted during the first two symbols, a demodulation reference signal (DMRS) 404 transmitted during a third symbol, and a PDSCH 406 transmitted during the remaining symbols. Although FIG. 4 illustrates a slot 400 having 14 OFDM symbols, the slot 400 may include a variable number of symbol periods (e.g., 7, 12, or 14 symbols) depending on the SCS.

In order to receive the slot 400, the UE 120 receiver circuitry is in a first mode 410 wherein the receiver circuitry is ON. In the first mode 410, the UE 120 receives the PDCCH 402 carrying the conventional DCI. Here, the DCI message includes a 16-bit radio network temporary identifier (RNTI) identifying a particular UE (e.g., UE 120), and a 5-bit modulation coding scheme (MCS) indicating a modulation and a coding rate of data transmitted on a downlink channel (e.g., PDSCH). The DCI provides the identified UE 120 with a resource allocation over which the identified UE 120 receives the downlink data.

Once the DCI is received, the UE 120 begins a DCI processing mode 412 to decode the DCI and determine which, if any, PDSCH 406 resources have been allocated to the UE 120. Decoding a standard DCI may require a duration of time of at least four symbols, which may be longer if multiple component carriers need to be decoded. It should be noted that during the decoding of the DCI, the UE 120 is receiving and storing all the PDSCH 406 it receives. Moreover, because the UE 120 may not know the MCS associated with the PDSCH 406 until the DCI is decoded, the UE 120 receiver circuitry may collect the PDSCH 406 at each symbol using default highest quality receiving which uses a relatively high amount of power.

In this example, the UE 120 completes decoding of the DCI at the end of Symbol 5 and puts the receiver circuitry into a second mode 414. For example, if the DCI indicates that there are no resources allocated to the UE 120 in the slot 400, or if the allocated resources have already been received by the UE 120, then the second mode 414 may be a sleep mode (e.g., a low or no power mode) for the remaining six symbols of the slot 400. Alternatively, if there are downlink resources in the remaining symbols of the slot 400 that are assigned to the UE 120, then the second mode 414 may be a receive mode to receive downlink data according to the MCS provided by the DCI.

Receiving and decoding the standard DCI format may require at least six symbols, during which the UE's 120 receiver circuitry is using a relatively high amount of power because the receiver circuitry is operating for maximum accuracy. Thus, techniques and apparatus for reducing the amount of time required to decode a DCI would improve the power efficiency of a UE 120.

Example DCI Format for Reducing UE Power Consumption

Aspects of the disclosure provide for a downlink control information (DCI) message formatted such that one or more fields have a reduced number of bits relative to the conventional DCI message discussed above in FIG. 4. For example, if one or more of a radio network temporary identifier (RNTI) and/or a modulation coding scheme (MCS) of the DCI comprise a reduced number of bits, a UE 120*a* can decode such information more quickly than if the one or more fields included a full number of bits. This allows the UE 120*a* to make a determination of whether to put the receive circuitry into a sleep mode before any data is transmitted on a physical downlink shared channel (PDSCH). As such, the UE 120*a* is no longer required to receive and store data transmitted over the PDSCH while decoding a DCI, which allows the UE 120*a* to conserve power and memory resources by putting the receiver circuitry into a low-power or no-power mode.

Figure 5A:
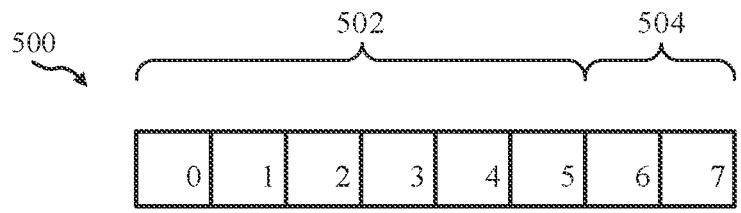
FIG. 5A is a block diagram illustrating a conceptual example of a number of radio network temporary identifier (RNTI) and modulation and coding scheme (MCS) bits, in accordance with certain aspects of the present disclosure.

FIG. 5A is a block diagram illustrating a conceptual example of a number of RNTI and MCS bits that a BS 110*a* may modulate into a DCI. In this example, the BS 110*a* may modulate eight bits 500 into the DCI. Bits 0-5 may include a 6-bit portion of an RNTI (e.g., "sRNTI" 502), and bits 6 and 7 may include a 2-bit portion of an MCS (e.g., "sMCS" 504). It is appreciated, however, that the values and data recited throughout this description are examples, and may be changed to any different values and/or data suitable for modulation in a DCI and identifying an intended recipient UE. For example, instead of or in addition to the sRNTI 502, the BS 110 may use a less than whole portion of any identifier that can be used to identify an intended recipient. Some examples of possible UE identifiers include international mobile equipment identity (IMEI), globally unique temporary UE identity (GUTI), serving temporary mobile subscriber identity (S-TMSI), packet temporary mobile subscriber identity (P-TMSI), subscription concealed identifier (SUCI), subscription permanent identifier (SUPI), IP address, etc. Moreover, the number of bits to be modulated into a DCI may be any suitable number of bits. For example, if only an sRNTI 502 is to be modulated (e.g., no sMCS 504 included), then the modulated bits may be reduced to five, or any other suitable number for identifying one or more intended UE recipients.

Figure 5B:
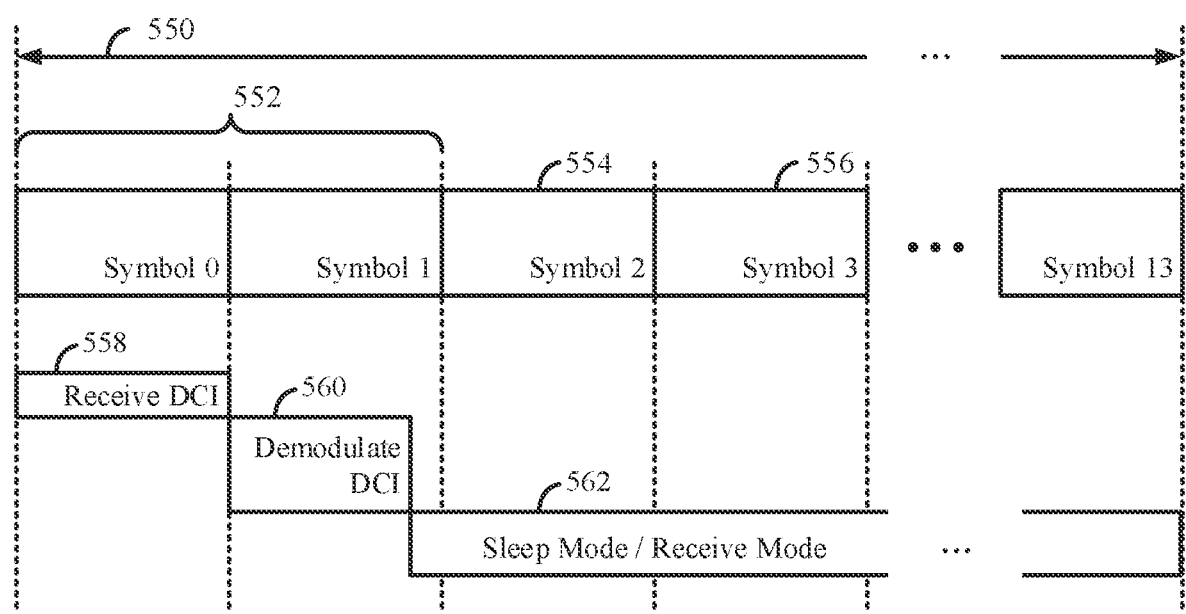
FIG. 5B is a block diagram illustrating example UE processing steps for processing a PDCCH carrying a DCI message comprising one or more of a shortened RNTI (sRNTI) and shortened MCS (sMCS), in accordance with certain aspects of the present disclosure.

FIG. 5B is a block diagram illustrating example UE 120*a* processing steps for processing a physical downlink control channel (PDCCH) 552 carrying a DCI message comprising one or more of a modulated sRNTI and sMCS. In this example, the processing steps occur during an initial four symbols of a slot 550. The PDCCH 552 carrying the DCI is transmitted by the BS 110*a* over symbols 0 and 1. Symbol 2 may carry a demodulation reference signal (DMRS) 554, and symbol 3 is the first symbol of a PDSCH 556 carrying data associated with the DCI.

In some examples, the BS 110*a* may configure a dedicated PDCCH search space in symbol 0 for transmitting the DCI, and provide any capable UEs 120 with an indication of the search space. Accordingly, a UE 120*a* may receive 558 the DCI in symbol 0, and begin demodulating 560 an sRNTI and/or sMCS of the DCI. Because the sRNTI and sMCS have fewer bits than a full RNTI and MCS, and/or because the DCI carrying the sRNTI and/or sMCS may not include the additional data carried by a conventional DCI (e.g., PDSCH allocation position, retransmission parameters, etc.), the UE 120*a* may be able to demodulate the sRNTI and/or sMCS prior to the end of symbol 1. If the sRNTI does not identify the UE 120*a* as an intended recipient of data communicated over the PDSCH, then the UE 120*a* may put its receiver circuitry into a sleep mode 562 prior to the PDSCH. In this case, the UE 120*a* is able to put its receiver circuitry into a low power mode prior to the UE of FIG. 4, and the UE 120*a* does not have to receive and store any of the data transmitted over the PDSCH before determining that the PDSCH does not carry any data intended for it. Alternatively, if the sRNTI identifies the UE 120*a*, then the UE 120*a* may proceed to configure its receiver circuitry to receive 562 any data over PDSCH resources allocated to the UE 120*a*.

Figure 6:
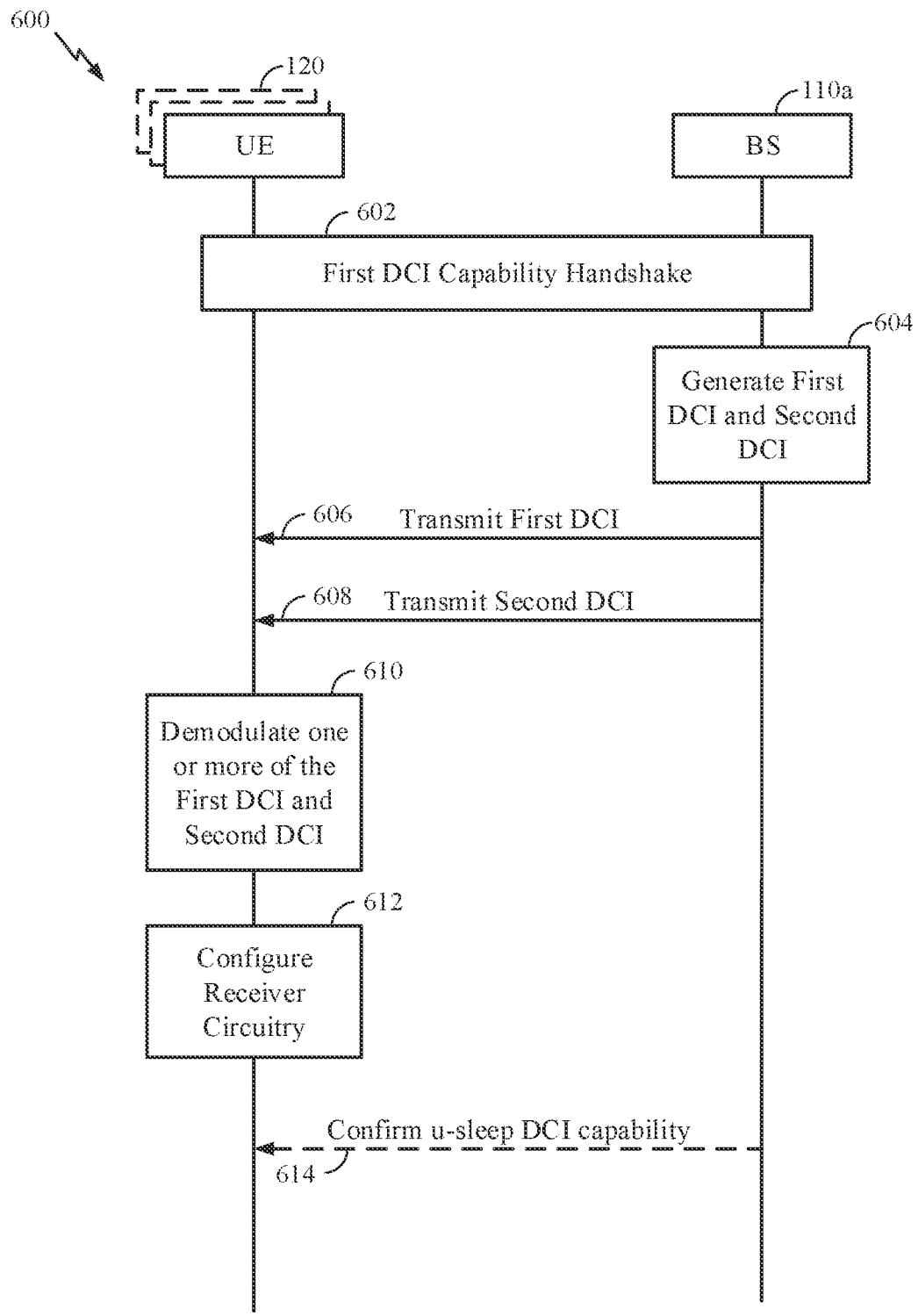
FIG. 6 is a call flow diagram illustrating communication of a first DCI between one or more UEs and a BS according to certain aspects of the disclosure.

FIG. 6 is a call flow diagram 600 illustrating communication of a first DCI between one or more UEs 120 and a BS 110*a* according to certain aspects of the disclosure. As described herein, the first DCI corresponds to the DCI described in FIGS. 5A and 5B, and the second DCI corresponds to the DCI described in FIG. 4. As discussed, the first DCI may be formatted differently relative to the second DCI, such as including fields that accommodate only a portion of certain values (e.g., a portion of an RNTI and/or MCS).

Initially, the BS 110*a* may perform a handshake 602 with a first UE (e.g., UE 120*a* of the one or more UEs 120) and optionally one or more additional UEs 120 to determine whether the one or more UEs 120 support a capability of receiving and processing a first DCI in a PDCCH. For example, the BS 110*a* may transmit a signal querying the one or more UEs 120, including the first UE 120*a*, to determine whether the one or more UEs 120 support the capability.

In one example, the first UE 120*a* may respond to the BS 110*a* query with a message indicating that the first UE 120*a* supports the capability. The BS 110*a* may then reply to the first UE's 120*a* response with an indication of one or more search spaces within a PDCCH that the first UE 120*a* can use to search for the first DCI. If more than one of the UEs 120 indicate that they support the capability, the BS 110*a* may provide the same indication of one or more search spaces within the PDCCH to the other UEs 120 that also support the capability. Here, the one or more search spaces may indicate a potential location of the first DCI within the PDCCH for a slot. However, in some examples, the indication may provide an indication of one or more dedicated search spaces within a slot and one or more subsequent slots. For example, if the BS 110*a* transmits the first DCI within a first symbol (e.g., symbol 0 of the slot 550 of FIG. 5B) of a slot, the indication of the dedicated one or more search spaces may include possible locations of the first DCI within symbol 0 for the slot, as well as subsequent slots.

During the handshake 602, the BS 110*a* may also provide the one or more UEs 120 with a communication parameter indicating a threshold value for use of the first DCI. For example, the threshold value may indicate a minimum communication quality, as measured by the one or more UEs 120, for each of the one or more UEs 120 to use the first DCI. The threshold value may be a minimum of one or more of a signal-to-noise ratio (SNR), a reference signal received power (RSRP), a receive strength signal indicator (RSSI), a reference signal received quality (RSRQ), or any other suitable metric a UE can use for measuring the quality of a communication channel between the UE and a BS. For example, the BS 110*a* may transmit an indication of a minimum SNR value (e.g., threshold value of a communication parameter) to the first UE 120*a*. The first UE 120 may then measure the frequency channel over which the first UE 120*a* and the BS 110*a* communicate to determine an SNR of the frequency channel. The first UE 120*a* may then compare the SNR (as measured by the first UE) with the minimum SNR value (as provided by the BS 110*a*) to determine whether the first UE 120*a* can use the first DCI. If the measured SNR is greater than or equal to the minimum SNR value, then the UE 120*a* may use the first DCI because signals transmitted by the BS 110*a* to the first UE 120*a* are high enough in quality for the first UE 120*a* to be able to use the first DCI. However, if the measured SNR is less than the minimum SNR value, then the first UE 120*a* may determine to not use the first DCI because signals transmitted by the BS 110*a* to the first UE 120*a* are not high enough in quality for the UE 120*a* to effectively use the first DCI. In some examples, the first UE 120*a* may transmit a negative acknowledgement (NACK) in response to a determination that the measured SNR is less than the minimum SNR value.

After the handshake 602 between the one or more UEs 120 and the BS 110*a*, the BS 110*a* perform a first process 604 by generating a first DCI message and a second DCI message for transmission to the one or more UEs 120. In one example, if the BS 110*a* is only transmitting the first DCI to a single UE (e.g., the first UE 120*a*), then the BS may generate the first DCI by including an sRNTI in the first DCI. For example, the sRNTI may include a portion of an identifier of the first UE 120*a* in the first DCI. In this example, the identifier may be a 16-bit RNTI of the first UE 120*a*. Thus, the sRNTI may include only a portion of the RNTI (e.g., six least significant bits of the 16 bit RNTI) of the first UE 120*a* to generate the first DCI. In another example, if the BS 110*a* is transmitting a first DCI to each of a plurality of UEs 120, the BS may generate each first DCI with a portion of an identifier that is common to each corresponding UE of the plurality of UEs 120 that is capable of receiving and processing a first DCI in a PDCCH.

In certain aspects, the BS 110*a* may further generate the first DCI by including a portion of a modulation and a coding rate of a downlink signal carrying downlink data. For example, if the first DCI includes a portion of an identifier of the first UE 120*a*, then the first UE 120*a* may interpret the first DCI as an indication that downlink resources are scheduled for the first UE 120*a* in the slot that the first DCI is transmitted in. In some examples, the portion of the MCS may be referred to as an sMCS. For example, the sMCS may include a portion of a 5-bit MCS (e.g., two bits of the 5-bit MCS) indicative of the MCS to be used for the downlink signal to be transmitted on the allocated resources for the first UE 120*a*. This may provide the first UE 120*a* with an indication of how to configure the first UE's 120*a* receiver circuitry in order to receive downlink data transmitted over the PDSCH while not using more power than is necessary to receive downlink data, such as to accommodate any MCS that is mappable to the sMCS (e.g., the highest MCS mappable to the sMCS). For example, many MCS may map to the same sMCS, as the sMCS is a reduced number of bits. The BS 110*a* may generate the second DCI message according to any suitable means for generating a conventional DCI message. For example, the second DCI message may include a 16-bit RNTI and a 5-bit MCS, as well as an indication of a resource allocation by which the first UE 120*a* can receive downlink data transmitted over the PDSCH.

In certain aspects, the BS 110*a* may determine whether there may be a collision of sRNTIs being transmitted in one or more first DCI messages. For example, a first DCI message may include an sRNTI that identifies two or more UEs 120 (e.g., two or more UEs 120 have the same sRNTI in a particular slot). For example, many RNTI (and thus many UEs corresponding to such RNTIs) may map to the same sRNTI, as the sRNTI is a reduced number of bits. In such a case, the BS 110*a* may select an sMCS for the first DCI message that is the highest sMCS required by a UE from among the two or more UEs. In this way, the UE requiring the highest MCS may not be affected by a potential collision.

At a first communication 606, the BS 110a may transmit a first DCI generated at the first process 604 to the first UE, and optionally, one or more other UEs 120 capable of receiving and processing the first DCI. For example, a single first DCI with the same sRNTI values may be transmitted to several UEs, where the sRNTI values correspond to each of the several UEs. As discussed below in more detail, the sMCS of the single first DCI may correspond to the highest sMCS of the several UEs. In some examples, the BS 110a may transmit multiple first DCIs to a plurality of UEs 120 using orthogonal and/or low correlation sequences. For example, the BS 110a may utilize Zadoff-Chu sequences to simultaneously transmit multiple first DCIs to the plurality of UEs 120. By utilizing orthogonal Zadoff-Chu sequences, the cross-correlation of the simultaneous transmissions is reduced, thereby reducing or eliminating inter-cell interference from the simultaneous transmissions. For example, the BS 110a may transmit the multiple first DCIs using Nu parallel data symbol sequences according to a determined orthogonal sequence. Alternatively, different first DCIs may be transmitted using separate corresponding resources, or using different orthogonal sequences for transmission.

In some examples, the first communication 606 may include transmission of multiple first DCIs to the first UE 120a. For example, if the first UE 120a supports multiple concurrent directional beams, the BS 110a may transmit a first DCI on each of one or more of the directional beams. In this example, the first UE 120a may support several search spaces, and at each search space may correspond to a separate first DCI for the first UE 120a to detect.

At a second communication 608, the BS may transmit a second DCI generated at the first process 604 to the first UE, and optionally, one or more additional second DCIs to other UEs 120. It should be noted that the first DCI and the second DCI may be transmitted simultaneously in time. For example, at least of portion of the first DCI and the second DCI may be transmitted within a first symbol (e.g., symbol 0 of the slot 550 of FIG. 5B) of a slot. In certain aspects, the first DCI may be transmitted within a first symbol in-time (e.g., symbol 0 of the slot 550 of FIG. 5B) of a slot while the second DCI is transmitted in the first symbol and a second symbol (e.g., symbol 1 of the slot 550 of FIG. 5B) immediately following the first symbol. Thus, the first UE 120a may receive both the first DCI and the second DCI, and may store the second DCI while it decodes the first DCI to determine if the first UE 120a has an allocated resource on the slot.

At a second process 610, the first UE 120a may decode/demodulate one or more of the received first DCI and second DCI. For example, if the first UE 120a decodes the first DCI and determines that the sRNTI of the first DCI does not identify the first UE 120a, then the first UE 120a may discard any stored portion of the second DCI and immediately put the receiver circuitry into a sleep mode or low power mode for the remaining portion of the slot. The receiver circuitry may "wake up" or become active in order to perform the same process on a subsequent slot. However, if the sRNTI of the first DCI identifies the first UE 120a, then the first UE 120a may configure the receiver circuitry according to the sMCS. The first UE 120a may then decode the second DCI to determine a resource allocation (e.g., the PDSCH resources used to transmit data to the first UE 120a).

Accordingly, at a third process 612, the first UE 120a may configure its receiver circuitry according to whether the first UE 120a received a first DCI identifying the first UE. For example, the first UE 120a may decode the sMCS and map the 2-bit sMCS to a particular operational mode of the receiver circuitry. An operational mode may include a mode of operation of one or more of an analog-to-digital converter (ADC), a digital front end (DFE), and any other circuitry or operational aspect of the first UEs 120a receiver circuitry.

In some examples, the first UE 120a may measure a quality of the received signaling containing one or more of the first DCI message and the second DCI message to determine a communication parameter indicative of a quality of the communication link between the first UE 120a and the BS 110a. As discussed, the communication parameter may include one or more of an SNR, an RSRP, an RSSI, an RSRQ, or any other suitable metric a UE can use for measuring and determining the quality of a communication channel between the first UE 120a and the BS 110a. In some examples, the first UE 120a may compare the communication parameter (as measured by the first UE 120a) with the sMCS value provided by the first DCI. If the communication parameter is lower than what is required by the sMCS, the first UE 120a may determine to not use the first DCI because signals transmitted by the BS 110a to the first UE 120a are not high enough in quality for the UE 120a to effectively use the first DCI. In some examples, the first UE 120a may transmit a negative acknowledgement (NACK) and/or put the receiver circuitry into a sleep mode.

Alternatively, if the communication parameter is greater than or equal to what is required by the sMCS (e.g., the communication link between the first UE 120a and the BS 110a can support the indicated sMCS of the downlink communication), then the receiver circuitry can operate with appropriate accuracy with respect to the determined communication parameter and the sMCS.

In a third communication 614, the first UE 120a and any other UEs 120 may receive downlink data according to an allocation of resources provided by the second DCI if the first UE 120a and other UEs 120 are identified by the sRNTI of the first DCI, and are capable of receiving the downlink data according to the sMCS of the first DCI.

Figure 7:
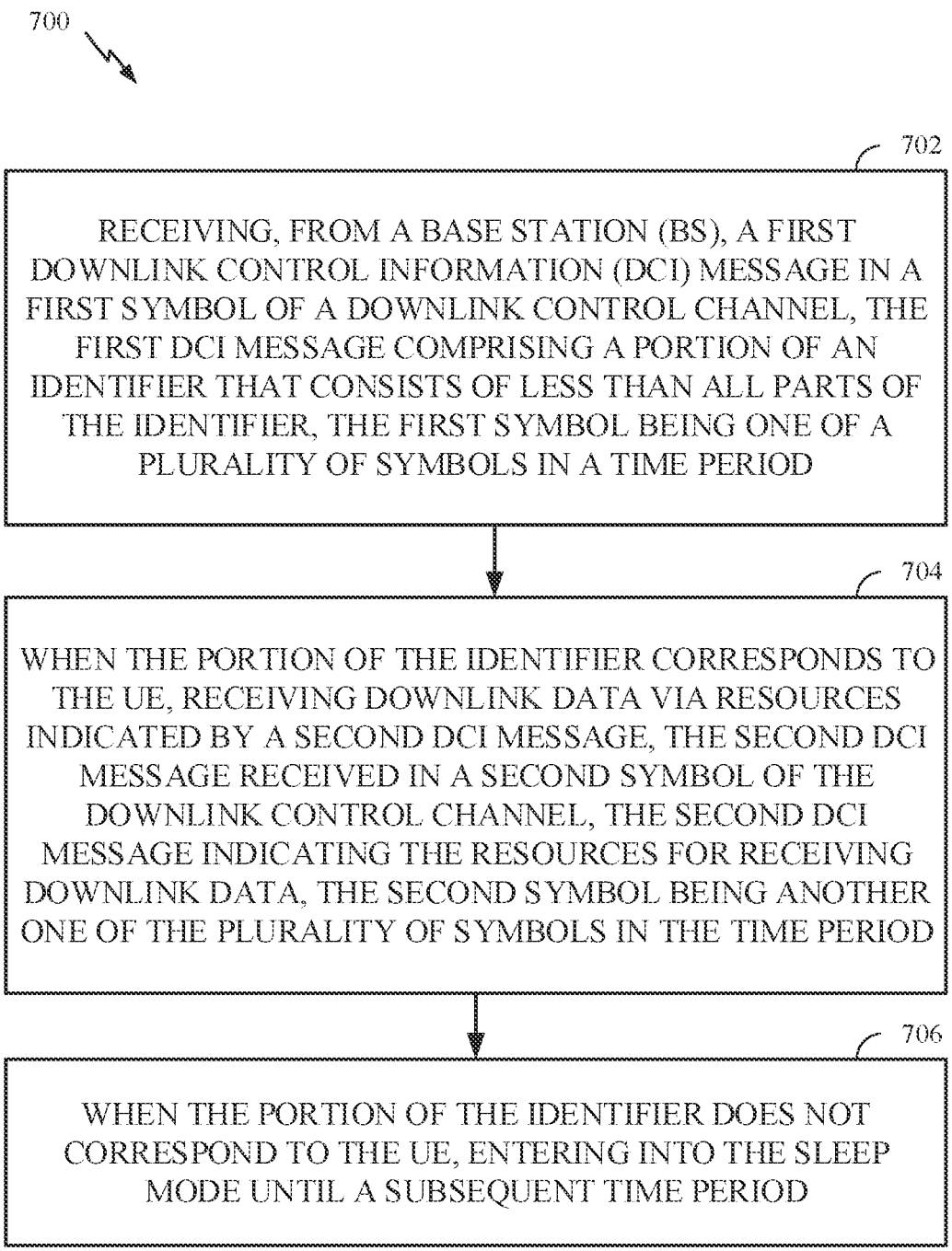
FIG. 7 is a flow diagram illustrating example operations for wireless communication by a UE, in accordance with certain aspects of the present disclosure.

FIG. 7 is a flow diagram illustrating example operations 700 for wireless communication, in accordance with certain aspects of the present disclosure. The operations 700 may be performed, for example, by a UE (e.g., such as the UE 120a in the wireless communication network 100). The operations 700 may be implemented as software components that are executed and run on one or more processors (e.g., controller/processor 280 of FIG. 2). Further, the transmission and reception of signals by the UE in operations 700 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 700 may begin, at a first block 702, by receiving, from a BS, a first DCI message in a first symbol of a downlink control channel, the first DCI message comprising a portion of an identifier that consists of less than all parts of the identifier, the first symbol being one of a plurality of symbols in a time period.

The operations 700 may proceed at a second block 704 by, when the portion of the identifier corresponds to the UE, receiving downlink data via resources indicated by a second DCI message, the second DCI message received in a second symbol of the downlink control channel, the second DCI message indicating the resources for receiving downlink data, the second symbol being another one of the plurality of symbols in the time period.

The operations 700 may proceed at a third block 706 by, when the portion of the identifier does not correspond to the UE, entering into the sleep mode until a subsequent time period.

In certain aspects, receiving downlink data via resources indicated by the second DCI message comprises receiving downlink data via resources indicated by the second DCI message when a communication parameter of a communication link between the UE and the BS as measured by the UE is equal to or greater than a threshold value, and further comprising, when the portion of the identifier corresponds to the UE, entering into a sleep mode until the subsequent time period when the communication parameter of the communication link is less than the threshold value.

In certain aspects, the first DCI message further comprises an indication of the threshold value.

In certain aspects, the indication comprises a portion of a plurality of bits that consists of less than all of the plurality of bits of a modulation and coding scheme (MCS) associated with the downlink data.

In certain aspects, the operations 700 include measuring a quality of one or more of the first DCI message and the second DCI message to determine the communication parameter.

In certain aspects, the first DCI message further comprises an indication comprising a portion of a plurality of bits that consists of less than all of the plurality of bits of a modulation and coding scheme (MCS) associated with the downlink data, and further comprising determining an operational mode for receiver circuitry of the UE based on the indication, wherein receiving the downlink data via resources indicated by the second DCI message further comprises receiving, via the receiver circuitry, the downlink data according to the determined operational mode.

In certain aspects, the UE is a first UE, wherein the portion of the identifier corresponds to at least the first UE and a second UE, the first UE having a first signal quality requirement and the second UE having a second signal quality requirement requiring higher signal quality relative to the first signal quality requirement.

In certain aspects, the identifier is a radio network temporary identifier (RNTI) comprising a plurality of bits, and wherein the portion of the identifier consists of less than all of the plurality of bits.

In certain aspects, the operations 700 include receiving, from the BS, a search space within the downlink control channel, the search space indicating a potential location of the first DCI message within the first symbol.

In certain aspects, the operations 700 include transmitting, to the BS, signaling indicating that the UE supports receiving the first DCI message, wherein receiving the first DCI message is in response to the signaling.

In certain aspects, the first DCI message comprises a first format, and wherein the second DCI message comprises a second format different from the first format.

In certain aspects, the resources indicated by the second DCI message occur within the time period.

In certain aspects, entering the UE into a sleep mode occurs prior to or during transmission of the second DCI message.

Figure 8:
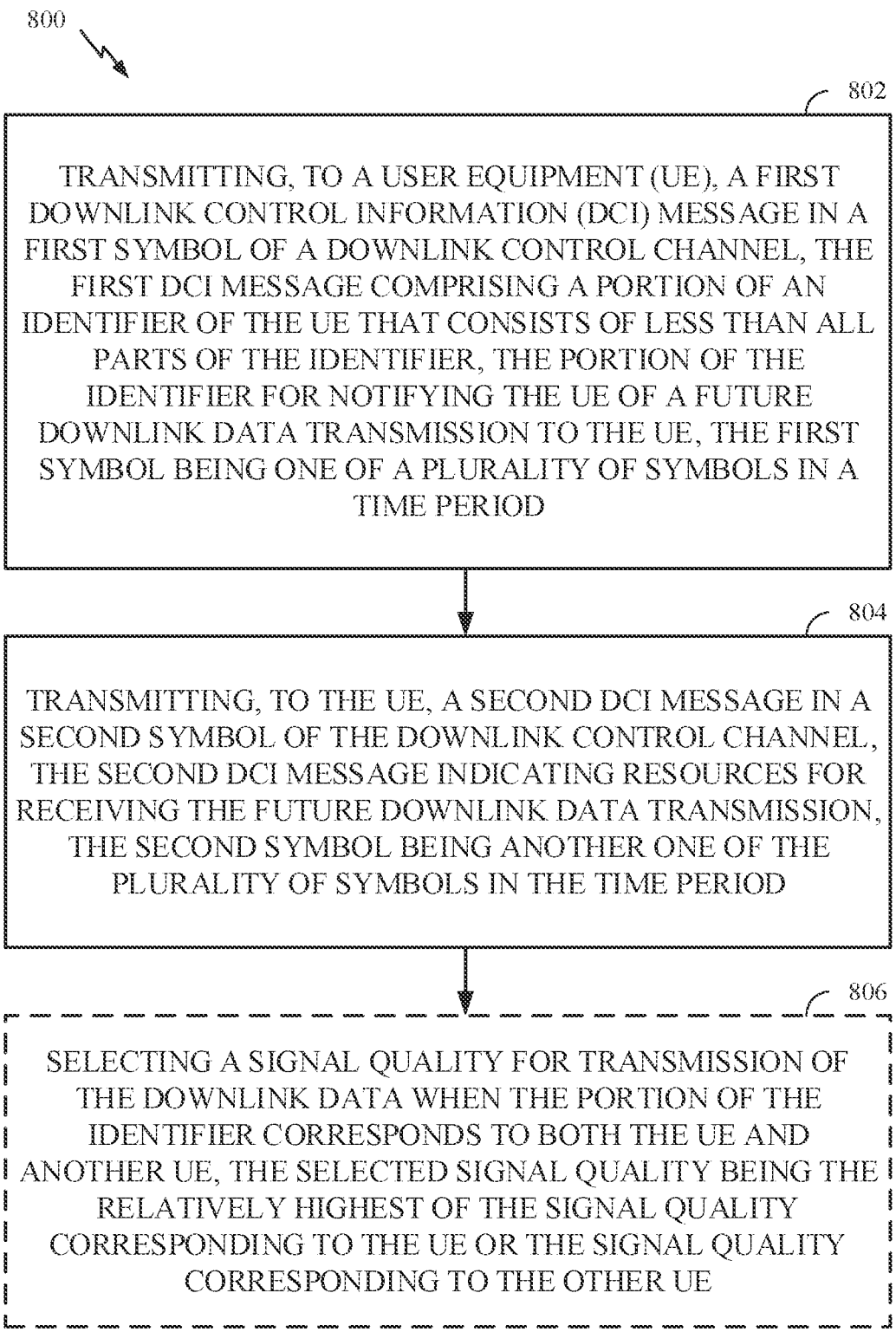
FIG. 8 is a flow diagram illustrating example operations for wireless communication by a BS, in accordance with certain aspects of the present disclosure.

FIG. 8 is a flow diagram illustrating example operations 800 for wireless communication, in accordance with certain aspects of the present disclosure. The operations 800 may be performed, for example, by a BS (e.g., such as the BS 110a in the wireless communication network 100). The operations 800 may be complementary to the operations 700 performed by the UE. The operations 800 may be implemented as software components that are executed and run on one or more processors (e.g., controller/processor 240 of FIG. 2). Further, the transmission and reception of signals by the BS in operations 800 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 800 may begin, at block 802, by transmitting, to a UE, a first DCI message in a first symbol of a downlink control channel, the first DCI message comprising a portion of an identifier of the UE that consists of less than all parts of the identifier, the portion of the identifier for notifying the UE of a future downlink data transmission to the UE, the first symbol being one of a plurality of symbols in a time period.

The operations 800 may proceed, at block 804 by transmitting, to the UE, a second DCI message in a second symbol of the downlink control channel, the second DCI message indicating resources for receiving the future downlink data transmission, the second symbol being another one of the plurality of symbols in the time period.

Optionally, the operations 800 may proceed, at block 806 by selecting the signal quality for transmission of the downlink data when the portion of the identifier corresponds to both the UE and another UE, the selected signal quality being the relatively highest of the signal quality corresponding to the UE or the signal quality corresponding to the other UE.

In certain aspects, the first DCI message further comprises a threshold value indicating a minimum signal quality required for the UE to detect the downlink data.

In certain aspects, the signal quality is a modulation and coding scheme (MCS) comprising a plurality of bits, and wherein the threshold value comprises less than all of the plurality of bits.

In certain aspects, the identifier is a radio network temporary identifier (RNTI) comprising a plurality of bits, and wherein the portion of the identifier consists of less than all of the plurality of bits.

In certain aspects, the portion of the plurality of bits correspond to a group of UEs actively monitoring the downlink control channel during the time period.

In certain aspects, the operations 800 include receiving, from the UE, signaling indicating that the UE supports receiving the first DCI message, wherein transmitting the first DCI message is in response to the signaling.

In certain aspects, the first DCI message comprises a first format, and wherein the second DCI message comprises a second format different from the first format.

In certain aspects, the future downlink data transmission occurs within the time period.

In certain aspects, the operations 800 include transmitting, to the UE, downlink data using the resources indicated by the second DCI message.

In certain aspects, the operations 800 include transmitting, to the UE, a search space within the downlink control channel, the search space indicating a potential location of the first DCI message within the first symbol.

Figure 9:
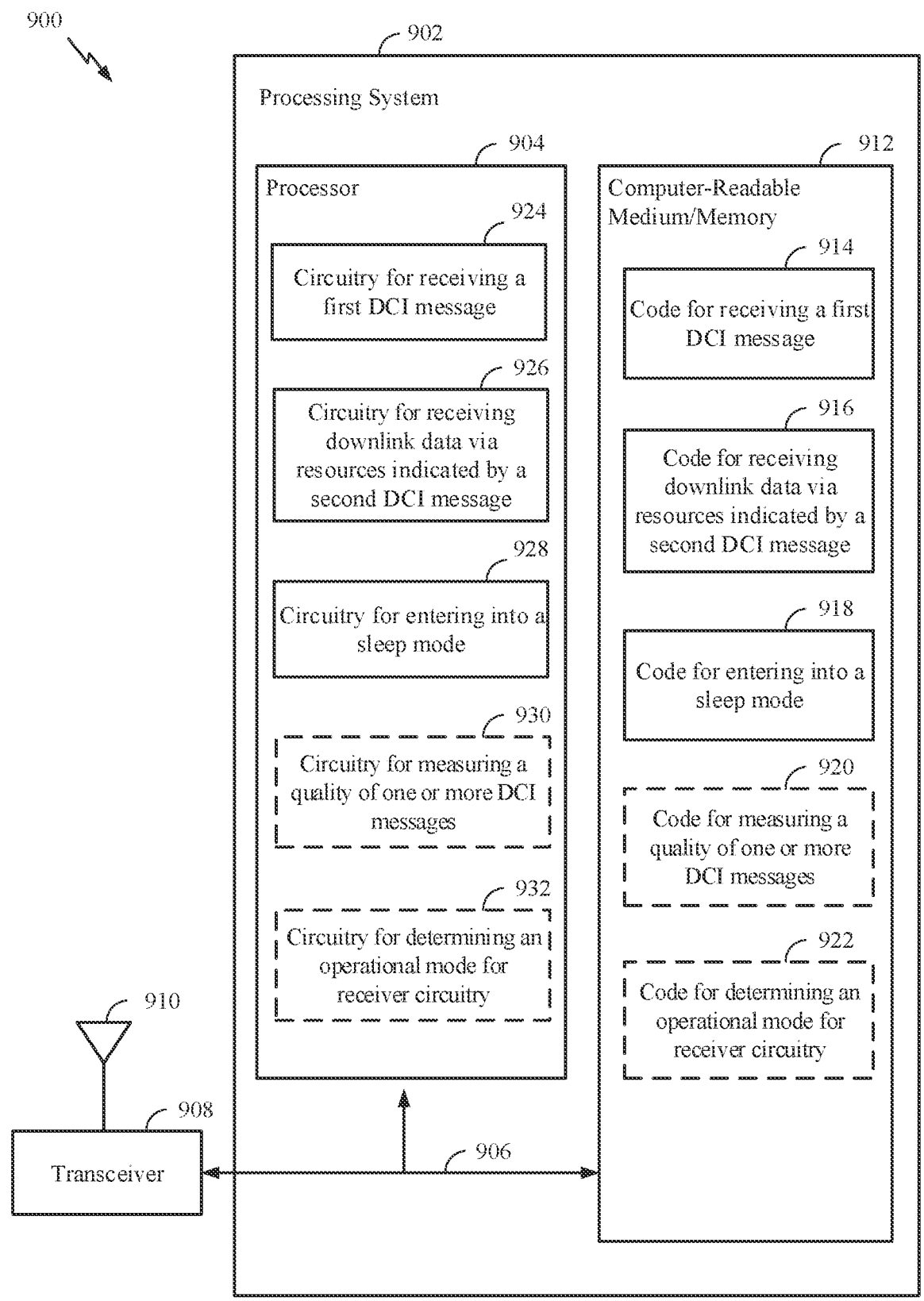
FIG. 9 illustrates a communications device that may include various components configured to perform operations for the techniques disclosed herein in accordance with aspects of the present disclosure.

FIG. 9 illustrates a communications device 900 that may include various components (e.g., corresponding to means-plus-function components) configured to perform operations for the techniques disclosed herein, such as the operations illustrated in FIG. 7. The communications device 900 includes a processing system 902 coupled to a transceiver 908 (e.g., a transmitter and/or a receiver). The transceiver 908 is configured to transmit and receive signals for the communications device 900 via an antenna 910, such as the various signals as described herein. The processing system 902 may be configured to perform processing functions for the communications device 900, including processing signals received and/or to be transmitted by the communications device 900.

The processing system 902 includes a processor 904 coupled to a computer-readable medium/memory 912 via a bus 906. In certain aspects, the computer-readable medium/memory 912 is configured to store instructions (e.g., computer-executable code) that when executed by the processor 904, cause the processor 904 to perform the operations illustrated in FIG. 7, or other operations for performing the various techniques discussed herein for improving power efficiency in wireless devices. In certain aspects, computer-readable medium/memory 912 stores code 914 for receiving, from a base station (BS), a first downlink control information (DCI) message in a first symbol of a downlink control channel, the first DCI message comprising a portion of an identifier that consists of less than all parts of the identifier, the first symbol being one of a plurality of symbols in a time period; code 916 for when the portion of the identifier corresponds to the UE: receiving downlink data via resources indicated by a second DCI message when a communication parameter of the UE is greater than a threshold value, the second DCI message received in a second symbol of the downlink control channel, the second DCI message indicating the resources for receiving downlink data, the second symbol being another one of the plurality of symbols in the time period; code 918 for when the portion of the identifier corresponds to the UE: entering into a sleep mode until a subsequent time period when the communication parameter of the UE is less than the threshold value, or when the portion of the identifier does not correspond to the UE, entering into the sleep mode until the subsequent time period; code 920 for measuring a quality of one or more of the first DCI message and the second DCI message to determine the communication parameter, wherein the communication parameter is a signal-to-noise ratio (SNR); and code 922 for determining an operational mode for receiver circuitry of the UE based on the indication of the signal quality and the SNR, wherein receiving the downlink data via resources indicated by the second DCI message further comprises receiving, via the receiver circuitry, the downlink data according to the determined power setting.

In certain aspects, the processor 904 has circuitry configured to implement the code stored in the computer-readable medium/memory 912. The processor 904 includes circuitry 924 for receiving, from a base station (BS), a first downlink control information (DCI) message in a first symbol of a downlink control channel, the first DCI message comprising a portion of an identifier that consists of less than all parts of the identifier, the first symbol being one of a plurality of symbols in a time period; circuitry 926 for when the portion of the identifier corresponds to the UE: receiving downlink data via resources indicated by a second DCI message when a communication parameter of the UE is greater than a threshold value, the second DCI message received in a second symbol of the downlink control channel, the second DCI message indicating the resources for receiving downlink data, the second symbol being another one of the plurality of symbols in the time period; circuitry 928 for when the portion of the identifier corresponds to the UE: entering into a sleep mode until a subsequent time period when the communication parameter of the UE is less than the threshold value, or when the portion of the identifier does not correspond to the UE, entering into the sleep mode until the subsequent time period; circuitry 930 for measuring a quality of one or more of the first DCI message and the second DCI message to determine the communication parameter, wherein the communication parameter is a signal-to-noise ratio (SNR); and circuitry 932 for determining an operational mode for receiver circuitry of the UE based on the indication of the signal quality and the SNR, wherein receiving the downlink data via resources indicated by the second DCI message further comprises receiving, via the receiver circuitry, the downlink data according to the determined power setting.

For example, means for receiving (or means for obtaining) may include a receiver and/or an antenna(s) 252 of the UE 120a illustrated in FIG. 2 and/or circuitry 924 and 926 of the communication device 900 in FIG. 9. Means for communicating may include a transmitter, a receiver or both. Means for generating, means for performing, means for determining, means for taking action, means for entering into a sleep mode, and means for measuring may include a processing system, which may include one or more processors, such as the receive processor 258, the transmit processor 264, the TX MIMO processor 266, and/or the controller/processor 280 of the UE 120a illustrated in FIG. 2 and/or the processing system 902 of the communication device 900 in FIG. 9.

Figure 10:
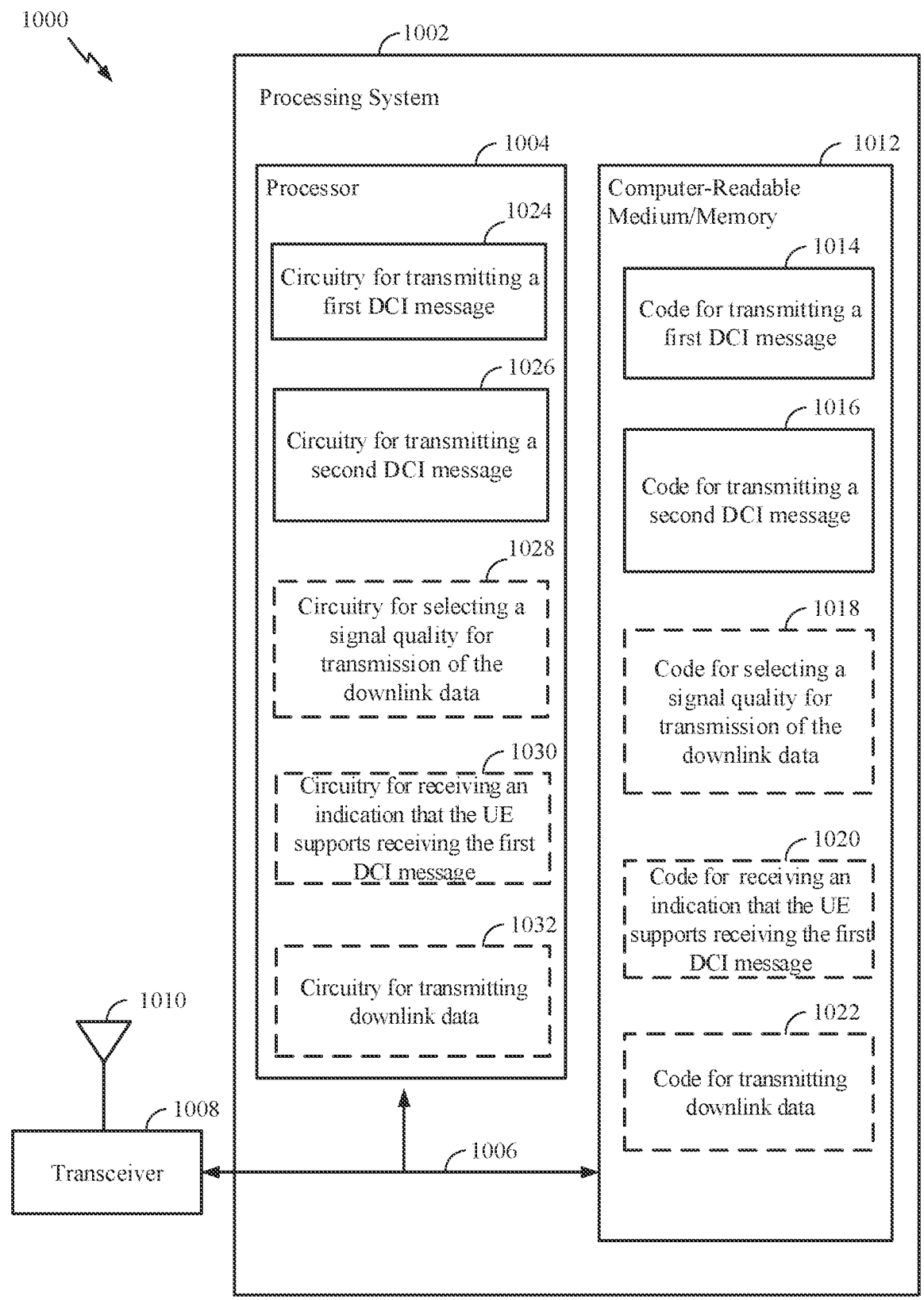
FIG. 10 illustrates a communications device that may include various components configured to perform operations for the techniques disclosed herein in accordance with aspects of the present disclosure.

FIG. 10 illustrates a communications device 1000 that may include various components (e.g., corresponding to means-plus-function components) configured to perform operations for the techniques disclosed herein, such as the operations illustrated in FIG. 8. The communications device 1000 includes a processing system 1002 coupled to a transceiver 1008 (e.g., a transmitter and/or a receiver). The transceiver 1008 is configured to transmit and receive signals for the communications device 1000 via an antenna 1010, such as the various signals as described herein. The processing system 1002 may be configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/memory 1012 is configured to store instructions (e.g., computer-executable code) that when executed by the processor 1004, cause the processor 1004 to perform the operations illustrated in FIG. 8, or other operations for performing the various techniques discussed herein for improving power efficiency in wireless devices.

In certain aspects, computer-readable medium/memory 1012 stores code 1014 for transmitting, to a user equipment (UE), a first downlink control information (DCI) message in a first symbol of a downlink control channel, the first DCI message comprising a portion of an identifier of the UE that consists of less than all parts of the identifier, the portion of the identifier for notifying the UE of a future downlink data transmission to the UE, the first symbol being one of a plurality of symbols in a time period; code 1016 for transmitting, to the UE, a second DCI message in a second symbol of the downlink control channel, the second DCI message indicating resources for receiving the future downlink data transmission, the second symbol being another one of the plurality of symbols in the time period; code 1018 for selecting a signal quality for transmission of the downlink data when the portion of the identifier corresponds to both the UE and another UE, the selected highest signal quality being the relatively highest of the signal quality corresponding to the UE or the signal quality corresponding to the other UE; code 1020 for receiving, from the UE, signaling indicating that the UE supports receiving the first DCI message, wherein transmitting the first DCI message is in response to the signaling; and code 1022 for transmitting, to the UE, downlink data using the resources indicated by the second DCI message.

In certain aspects, the processor 1004 has circuitry configured to implement the code stored in the computer-readable medium/memory 1012. The processor 1004 includes circuitry 1024 for transmitting, to a user equipment (UE), a first downlink control information (DCI) message in a first symbol of a downlink control channel, the first DCI message comprising a portion of an identifier of the UE that consists of less than all parts of the identifier, the portion of the identifier for notifying the UE of a future downlink data transmission to the UE, the first symbol being one of a plurality of symbols in a time period; circuitry 1026 for transmitting, to the UE, a second DCI message in a second symbol of the downlink control channel, the second DCI message indicating resources for receiving the future downlink data transmission, the second symbol being another one of the plurality of symbols in the time period; circuitry 1028 for selecting a signal quality for transmission of the downlink data when the portion of the identifier corresponds to both the UE and another UE, the selected highest signal quality being the relatively highest of the signal quality corresponding to the UE or the signal quality corresponding to the other UE; circuitry 1030 for receiving, from the UE, signaling indicating that the UE supports receiving the first DCI message, wherein transmitting the first DCI message is in response to the signaling; and circuitry 1032 for transmitting, to the UE, downlink data using the resources indicated by the second DCI message.

For example, means for transmitting (or means for outputting for transmission) may include a transmitter and/or an antenna(s) 234 or the BS 110*a* illustrated in FIG. 2 and/or circuitry 1024 for transmitting a first DCI message, circuitry 1026 for transmitting a second DCI message, and circuitry 1032 for transmitting downlink data of the communication device 1000 in FIG. 10. Means for receiving (or means for obtaining) may include a receiver and/or an antenna(s) 234 of the BS 110*a* illustrated in FIG. 2 and/or circuitry 1030 for receiving an indication that the UE supports receiving the first DCI message of the communication device 1000 in FIG. 10. Means for communicating may include a transmitter, a receiver or both. Means for generating, means for performing, means for determining, means for taking action, means for determining, means for selecting may include a processing system, which may include one or more processors, such as the transmit processor 220, the TX MIMO processor 230, the receive processor 238, and/or the controller/processor 240 of the BS 110*a* illustrated in FIG. 2 and/or the processing system 1002 of the communication device 1000 in FIG. 10.

Example Aspects

Implementation examples are described in the following numbered clauses:

1. A method for wireless communication by a user equipment (UE), comprising: receiving, from a base station (BS), a first downlink control information (DCI) message in a first symbol of a downlink control channel, the first DCI message comprising a portion of an identifier that consists of less than all parts of the identifier, the first symbol being one of a plurality of symbols in a time period; when the portion of the identifier corresponds to the UE, receiving downlink data via resources indicated by a second DCI message, the second DCI message received in a second symbol of the downlink control channel, the second DCI message indicating the resources for receiving downlink data, the second symbol being another one of the plurality of symbols in the time period; and when the portion of the identifier does not correspond to the UE, entering into a sleep mode until a subsequent time period.

2. The method of Aspect 1, wherein receiving downlink data via resources indicated by the second DCI message comprises receiving downlink data via resources indicated by the second DCI message when a communication parameter of a communication link between the UE and the BS as measured by the UE is equal to or greater than a threshold value, and further comprising, when the portion of the identifier corresponds to the UE, entering into a sleep mode until the subsequent time period when the communication parameter of the communication link is less than the threshold value.

3. The method of any of Aspects 1 and 2, wherein the first DCI message further comprises an indication of the threshold value.

4. The method of any of Aspects 1-3, wherein the indication comprises a portion of a plurality of bits that consists of less than all of the plurality of bits of a modulation and coding scheme (MCS) associated with the downlink data.

5. The method of any of Aspects 1-4, further comprising measuring a quality of one or more of the first DCI message and the second DCI message to determine the communication parameter.

6. The method of any of Aspects 1-5, wherein the first DCI message further comprises an indication comprising a portion of a plurality of bits that consists of less than all of the plurality of bits of a modulation and coding scheme (MCS) associated with the downlink data, and further comprising determining an operational mode for receiver circuitry of the UE based on the indication, wherein receiving the downlink data via resources indicated by the second DCI message further comprises receiving, via the receiver circuitry, the downlink data according to the determined operational mode.

7. The method of any of Aspects 1-6, wherein the UE is a first UE, wherein the portion of the identifier corresponds to at least the first UE and a second UE, the first UE having a first signal quality requirement and the second UE having a second signal quality requirement requiring higher signal quality relative to the first signal quality requirement.

8. The method of any of Aspects 1-7, wherein the identifier is a radio network temporary identifier (RNTI) comprising a plurality of bits, and wherein the portion of the identifier consists of less than all of the plurality of bits.

9. The method of any of Aspects 1-8, further comprising receiving, from the BS, a search space within the downlink control channel, the search space indicating a potential location of the first DCI message within the first symbol.

10. The method of any of Aspects 1-9, further comprising transmitting, to the BS, signaling indicating that the UE supports receiving the first DCI message, wherein receiving the first DCI message is in response to the signaling.

11. The method of any of Aspects 1-10, wherein the first DCI message comprises a first format, and wherein the second DCI message comprises a second format different from the first format.

12. The method of any of Aspects 1-11, wherein the resources indicated by the second DCI message occur within the time period.

13. The method of any of Aspects 1-12, wherein entering the UE into the sleep mode occurs prior to or during transmission of the second DCI message.

14. A method for wireless communication by a base station (BS), comprising: transmitting, to a user equipment (UE), a first downlink control information (DCI) message in a first symbol of a downlink control channel, the first DCI message comprising a portion of an identifier of the UE that consists of less than all parts of the identifier, the portion of the identifier for notifying the UE of a future downlink data transmission to the UE, the first symbol being one of a plurality of symbols in a time period; and transmitting, to the UE, a second DCI message in a second symbol of the downlink control channel, the second DCI message indicating resources for receiving the future downlink data transmission, the second symbol being another one of the plurality of symbols in the time period.

15. The method of Aspect 14, wherein the first DCI message further comprises a threshold value indicating a minimum signal quality required for the UE to detect the downlink data.

16. The method of any of Aspects 14 and 15, further comprising selecting the signal quality for transmission of the downlink data when the portion of the identifier corresponds to both the UE and another UE, the selected signal quality being the relatively highest of the signal quality corresponding to the UE or the signal quality corresponding to the other UE.

17. The method of any of Aspects 14-16, wherein the signal quality is a modulation and coding scheme (MCS) comprising a plurality of bits, and wherein the threshold value comprises less than all of the plurality of bits.

18. The method of any of Aspects 14-17, wherein the identifier is a radio network temporary identifier (RNTI) comprising a plurality of bits, and wherein the portion of the identifier consists of less than all of the plurality of bits.

19. The method of any of Aspects 14-18, wherein the portion of the plurality of bits correspond to a group of UEs actively monitoring the downlink control channel during the time period.

20. The method of any of Aspects 14-19, further comprising receiving, from the UE, signaling indicating that the UE supports receiving the first DCI message, wherein transmitting the first DCI message is in response to the signaling.

21. The method of any of Aspects 14-20, wherein the first DCI message comprises a first format, and wherein the second DCI message comprises a second format different from the first format.

22. The method of any of Aspects 14-21, wherein the future downlink data transmission occurs within the time period.

23. The method of any of Aspects 14-22, further comprising transmitting, to the UE, downlink data using the resources indicated by the second DCI message.

24. The method of any of Aspects 14-23, further comprising transmitting, to the UE, a search space within the downlink control channel, the search space indicating a potential location of the first DCI message within the first symbol.

25. A user equipment (UE) configured for wireless communication, comprising: a memory; and a processor coupled to the memory, the processor and the memory configured to: receive, from a base station (BS), a first downlink control information (DCI) message in a first symbol of a downlink control channel, the first DCI message comprising a portion of an identifier that consists of less than all parts of the identifier, the first symbol being one of a plurality of symbols in a time period; when the portion of the identifier corresponds to the UE, receive downlink data via resources indicated by a second DCI message, the second DCI message received in a second symbol of the downlink control channel, the second DCI message indicating the resources for receiving downlink data, the second symbol being another one of the plurality of symbols in the time period; and when the portion of the identifier does not correspond to the UE, enter into a sleep mode until a subsequent time period.

26. The UE of Aspect 25, wherein the processor and the memory, being configured to receive downlink data via resources indicated by the second DCI message, are further configured to: receive downlink data via resources indicated by the second DCI message when a communication parameter of a communication link between the UE and the BS as measured by the UE is equal to or greater than a threshold value; and when the portion of the identifier corresponds to the UE, enter into a sleep mode until the subsequent time period when the communication parameter of the communication link is less than the threshold value.

27. The UE of any of aspects 25 and 26, wherein the first DCI message further comprises an indication of the threshold value, and wherein the indication comprises a portion of a plurality of bits that consists of less than all of the plurality of bits of a modulation and coding scheme (MCS) associated with the downlink data.

28. A base station (BS) configured for wireless communication, comprising: a memory; and a processor coupled to the memory, the processor and the memory configured to: transmit, to a user equipment (UE), a first downlink control information (DCI) message in a first symbol of a downlink control channel, the first DCI message comprising a portion of an identifier of the UE that consists of less than all parts of the identifier, the portion of the identifier for notifying the UE of a future downlink data transmission to the UE, the first symbol being one of a plurality of symbols in a time period; and transmit, to the UE, a second DCI message in a second symbol of the downlink control channel, the second DCI message indicating resources for receiving the future downlink data transmission, the second symbol being another one of the plurality of symbols in the time period.

29. The BS of Aspect 28, wherein the first DCI message further comprises a threshold value indicating a minimum signal quality required for the UE to detect the downlink data.

30. The BS of any of Aspect 28 and 29, wherein the processor and the memory are further configured to select the signal quality for transmission of the downlink data when the portion of the identifier corresponds to both the UE and another UE, the selected signal quality being the relatively highest of the signal quality corresponding to the UE or the signal quality corresponding to the other UE.

31. A user equipment (UE) comprising: one or more means for performing the method of any of Aspects 1-13.

32. A base station (BS) comprising: one or more means for performing the method of any of Aspects 14-24.

33. A non-transitory computer-readable storage medium having instructions stored thereon for performing the method of any of Aspects 1-13 for wireless communication by a user equipment (UE).

34. A non-transitory computer-readable storage medium having instructions stored thereon for performing the method of any of Aspects 14-24 for wireless communication by a base station (BS).

Additional Considerations

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another. In other words, unless a specific order of steps or actions is specified, the order and/or use of specific steps and/or actions may be modified.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, a digital signal processor (DSP), an application specific integrated circuit (ASIC), or a processor (e.g., a general purpose or specifically programmed processor). Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above can also be considered as examples of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 7 and/or FIG. 8.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above.

The invention claimed is:

1. A method for wireless communication by a user equipment (UE), comprising:
    receiving, from a network node, a first downlink control information (DCI) message in a first symbol of a downlink control channel, the first DCI message comprising a portion of an identifier that consists of less than all parts of the identifier, the first symbol being one of a plurality of symbols in a time period;
    when the portion of the identifier corresponds to the UE:
        receiving downlink data via resources indicated by a second DCI message, the second DCI message received in a second symbol of the downlink control channel, the second DCI message indicating the resources for receiving downlink data, the second symbol being another one of the plurality of symbols in the time period, wherein receiving downlink data via resources indicated by the second DCI message comprises receiving downlink data via resources indicated by the second DCI message when a communication parameter of a communication link between the UE and the network node as measured by the UE is equal to or greater than a threshold value, and entering into a sleep mode until a subsequent time period when the communication parameter of the communication link is less than the threshold value;
    when the portion of the identifier does not correspond to the UE:
        entering into the sleep mode until the subsequent time period; and
    when the portion of the identifier corresponds to the UE, entering into the sleep mode until the subsequent time period when the communication parameter of the communication link is less than the threshold value.

2. The method of claim 1, wherein the first DCI message further comprises an indication of the threshold value.

3. The method of claim 2, wherein the indication comprises a portion of a plurality of bits that consists of less than all of the plurality of bits of a modulation and coding scheme (MCS) associated with the downlink data.

4. The method of claim 1, further comprising measuring a quality of one or more of the first DCI message and the second DCI message to determine the communication parameter.

5. The method of claim 1, wherein the first DCI message further comprises an indication comprising a portion of a plurality of bits that consists of less than all of the plurality of bits of a modulation and coding scheme (MCS) associated with the downlink data, and further comprising determining an operational mode for receiver circuitry of the UE based on the indication, wherein receiving the downlink data via resources indicated by the second DCI message further comprises receiving, via the receiver circuitry, the downlink data according to the determined operational mode.

6. The method of claim 1, wherein the UE is a first UE, wherein the portion of the identifier corresponds to at least the first UE and a second UE, the first UE having a first signal quality requirement and the second UE having a second signal quality requirement requiring higher signal quality relative to the first signal quality requirement.

7. The method of claim 1, wherein the identifier is a radio network temporary identifier (RNTI) comprising a plurality of bits, and wherein the portion of the identifier consists of less than all of the plurality of bits.

8. The method of claim 1, further comprising receiving, from the network node, a search space within the downlink control channel, the search space indicating a potential location of the first DCI message within the first symbol.

9. The method of claim 1, further comprising transmitting, to the network node, signaling indicating that the UE supports receiving the first DCI message, wherein receiving the first DCI message is in response to the signaling.

10. The method of claim 1, wherein the first DCI message comprises a first format, and wherein the second DCI message comprises a second format different from the first format.

11. The method of claim 1, wherein the resources indicated by the second DCI message occur within the time period.

12. The method of claim 1, wherein entering the UE into the sleep mode occurs prior to or during transmission of the second DCI message.

13. A method for wireless communication by a network node, comprising:
    transmitting, to a user equipment (UE), a first downlink control information (DCI) message in a first symbol of a downlink control channel, the first DCI message comprising a portion of an identifier of the UE that consists of less than all parts of the identifier, the portion of the identifier for notifying the UE of a future downlink data transmission to the UE, the first symbol being one of a plurality of symbols in a time period;
    transmitting, to the UE, a second DCI message in a second symbol of the downlink control channel, the second DCI message indicating resources for receiving the future downlink data transmission, the second symbol being another one of the plurality of symbols in the time period; and transmitting, to the UE, an indication of a threshold value indicating a minimum signal quality for the UE to monitor for the second DCI message.

14. The method of claim 13, wherein the first DCI message further comprises the threshold value indicating the minimum signal quality required for the UE to detect the future downlink data transmission.

15. The method of claim 14, further comprising selecting the signal quality for transmission of the downlink data when the portion of the identifier corresponds to both the UE and another UE, the selected signal quality being the relatively highest of the signal quality corresponding to the UE or the signal quality corresponding to the other UE.

16. The method of claim 14, wherein the signal quality is a modulation and coding scheme (MCS) comprising a plurality of bits, and wherein the threshold value comprises less than all of the plurality of bits.

17. The method of claim 13, wherein the identifier is a radio network temporary identifier (RNTI) comprising a plurality of bits, and wherein the portion of the identifier consists of less than all of the plurality of bits.

18. The method of claim 17, wherein the portion of the plurality of bits correspond to a group of UEs actively monitoring the downlink control channel during the time period.

19. The method of claim 13, further comprising receiving, from the UE, signaling indicating that the UE supports receiving the first DCI message, wherein transmitting the first DCI message is in response to the signaling.

20. The method of claim 13, wherein the first DCI message comprises a first format, and wherein the second DCI message comprises a second format different from the first format.

21. The method of claim 13, wherein the future downlink data transmission occurs within the time period.

22. The method of claim 13, further comprising transmitting, to the UE, downlink data using the resources indicated by the second DCI message.

23. The method of claim 13, further comprising transmitting, to the UE, a search space within the downlink control channel, the search space indicating a potential location of the first DCI message within the first symbol.

24. A user equipment (UE) configured for wireless communication, comprising:
a memory; and
one or more processors, individually or in any combination, coupled to the memory, the one or more processors and the memory are configured to cause the UE to:
receive, from a network node, a first downlink control information (DCI) message in a first symbol of a downlink control channel, the first DCI message comprising a portion of an identifier that consists of less than all parts of the identifier, the first symbol being one of a plurality of symbols in a time period;
when the portion of the identifier corresponds to the UE, receive downlink data via resources indicated by a second DCI message, the second DCI message received in a second symbol of the downlink control channel, the second DCI message indicating the resources for receiving downlink data, the second symbol being another one of the plurality of symbols in the time period;
receive downlink data via resources indicated by the second DCI message when a communication parameter of a communication link between the UE and the network node as measured by the UE is equal to or greater than a threshold value;
when the portion of the identifier does not correspond to the UE, enter into a sleep mode until a subsequent time period; and
when the portion of the identifier corresponds to the UE, enter into the sleep mode until the subsequent time period when the communication parameter of the communication link is less than the threshold value.

25. The UE of claim 24, wherein the first DCI message further comprises an indication of the threshold value, and wherein the indication comprises a portion of a plurality of bits that consists of less than all of the plurality of bits of a modulation and coding scheme (MCS) associated with the downlink data.

26. A network node configured for wireless communication, comprising:
a memory; and
one or more processors, individually or in any combination, coupled to the memory, the one or more processors and the memory are configured to cause the network node to:
transmit, to a user equipment (UE), a first downlink control information (DCI) message in a first symbol of a downlink control channel, the first DCI message comprising a portion of an identifier of the UE that consists of less than all parts of the identifier, the portion of the identifier for notifying the UE of a future downlink data transmission to the UE, the first symbol being one of a plurality of symbols in a time period;
transmitting, to the UE, an indication of a threshold value indicating a minimum signal quality required for the UE to detect the future downlink data transmission; and
transmit, to the UE, a second DCI message in a second symbol of the downlink control channel, the second DCI message indicating resources for receiving the future downlink data transmission, the second symbol being another one of the plurality of symbols in the time period.

27. The network node of claim 26, wherein the first DCI message further comprises the threshold value indicating the minimum signal quality required for the UE to detect the future downlink data transmission.

28. The network node of claim 27, wherein the processor and the memory are further configured to select the signal quality for transmission of the downlink data when the portion of the identifier corresponds to both the UE and another UE, the selected signal quality being the relatively highest of the signal quality corresponding to the UE or the signal quality corresponding to the other UE.

* * * * *